United States Patent Office 3,356,484
Patented Dec. 5, 1967

3,356,484
METHOD FOR THE CONTROL OF
UNDESIRABLE PLANT LIFE
Sidney B. Richter, Chicago, Ill., assignor to Velsicol
Chemical Corporation, a corporation of Illinois
No Drawing. Filed June 30, 1965, Ser. No. 468,595
8 Claims. (Cl. 71—87)

ABSTRACT OF THE DISCLOSURE

A method for the control of undesirable plant life which comprises applying to the locus of the said plant life a herbicidal composition comprising an inert carrier and as the essential active ingredient, in a quantity which is herbicidally injurious to said undesirable plant life, a compound of the formula

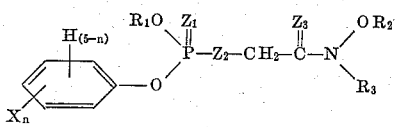

wherein $Z_1$, $Z_2$ and $Z_3$ are independently selected from the group consisting of sulfur and oxygen; $R_1$, $R_2$ and $R_3$ are independently selected lower alkyl; $n$ is an integer from 1 to 5; and each X is independently selected from the group consisting of halogen, cyano, lower alkyl, lower alkoxy, and lower alkylthio.

---

This invention relates to the control of undesirable plant life. More particularly, this invention relates to the control of undesirable plant life with the use of chemical compounds of the general formula

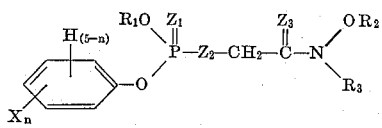

wherein $Z_1$, $Z_2$ and $Z_3$ are independently selected from the group consisting of sulfur and oxygen; $R_1$, $R_2$ and $R_3$ are independently selected lower alkyl; $n$ is an integer from 1 to 5; and each X is independently selected from the group consisting of halogen, cyano, lower alkyl, lower alkoxy and lower alkylthio. In a preferred embodiment of this invention $Z_1$ and $Z_2$ are sulfur and $Z_3$ is oxygen, $R_1$, $R_2$ and $R_3$ are independently selected alkyl containing 1 to 10 carbon atoms; $n$ is an integer from 1 to 3, and each X is independently selected from the group consisting of chlorine, bromine, cyano and alkyl, alkoxy and alkylthio containing 1 to 4 carbon atoms.

Unexpectedly, it has now been found that effective control of undesirable plant life can be attained with the compounds described above in the method of the present invention. Surprisingly, these compounds are practically harmless to many important crop plants, such as corn, cotton, rice, wheat, and the like; while they are effective in controlling weeds commonly found in areas where these and other crops are grown.

Exemplary of the compounds utilized in the method of the present invention are:

O-m-tolyl O-methyl S-(N-methoxy-N-isopropylcarbamylmethyl)dithiophosphate,
O-o-tolyl O-n-propyl S-(N-methoxy-N-isopropylcarbamylmethyl)dithiophosphate,
O-p-tolyl O-n-butyl S-(N-methoxy-N-isopropylcarbamylmethyl)dithiophosphate,
O-2,4,6-trimethylphenyl O-methyl S-(N-ethoxy-N-ethylcarbamylmethyl)dithiophosphate,
O-m-ethylphenyl O-ethyl S-(N-methoxy-N-n-propylcarbamylmethyl)dithiophosphate,
O-o-isopropylphenyl O-ethyl S-(N-methoxy-N-isopropylcarbamylmethyl)dithiophosphate,
O-m-chlorophenyl O-ethyl S-(N-methoxy-N-isopropylcarbamylmethyl)dithiophosphate,
O-p-chlorophenyl O-ethyl S-(N-methoxy-N-isopropylcarbtmylmethyl)dithiophosphate,
O-o-chlorophenyl O-ethyl S-(N-methoxy-N-isopropylcarbamylmethyl)dithiophosphate,
O-2,4-dichlorophenyl O-methyl S-(N-isopropoxy-N-methylcarbamylmethyl)dithiophosphate,
O-2,4,5-trichlorophenyl O-isopropyl S-(N-methoxy-N-ethylcarbamylmethyl)dithiophosphate,
O-2-methyl-4-chlorophenyl O-ethyl S-(N-isopropoxy-N-methylcarbamylmethyl)dithiophosphate,
O-m-bromophenyl O-methyl S-(N-ethoxy-N-ethylcarbamylmethyl)dithiophosphate,
O-pentachlorophenyl O-methyl S-(N-methoxy-N-isopropylcarbamylmethyl)dithiophosphate,
O-p-bromophenyl O-n-butyl S-(N-methoxy-N-n-propylcarbamylmethyl)dithiophosphate,
O-p-methoxyphenyl O-ethyl S-(N-methoxy-N-isopropylcarbamylmethyl)dithiophosphate,
O-3,5-dimethoxyphenyl O-ethyl S-(N-methoxy-N-isoproplycarbamylmethyl)dithiophosphate,
O-m-tolyl O-tert-butyl S-(N-methoxy-N-n-pentylcarbamylmethyl)dithiophosphate,
O-m-n-propylphenyl O-methyl S-(N-n-butoxy-N-ethylcarbamylmethyl)dithiophosphate,
O-2-ethyl-4-chlorophenyl O-n-hexyl S-(N-n-propoxy-N-propylcarbamylmethyl)dithiophosphate,
O-p-tert-butyl O-ethyl S-(N-ethoxy-N-n-propylcarbamylmethyl)dithiophosphate,
O-2,4,6-trimethylphenyl O-n-butyl S-(N-methoxy-N-decylcarbamylmethyl)dithiophosphate,
O-m-tolyl O-n-decyl S-(N-methoxy-N-isopropylcarbamylmethyl)dithiophosphate,
O-m-methylthiophenyl O-ethyl S-(N-methoxy-N-isopropylcarbamylmethyl)dithiophosphate,
O-2,4-di-(methylthio)phenyl O-isopropyl S-(N-n-pentyloxy-N-methylcarbamylmethyl)dithiophosphate,
O-o-ethoxyphenyl O-n-octyl S-(N-n-butoxy-N-ethylcarbamylmethyl)dithiophosphate,
O-2,4,5-trichlorophenyl O-methyl S-(N-n-decyloxy-N-methylcarbamylmethyl)dithiophosphate,
O-3,5-dibromophenyl O-n-propyl S-(N-methoxy-N-n-decylcarbamylmethyl)dithiophosphate,
O-(2-methoxy-3,6-dichlorophenyl) O-ethyl S-(N-methoxy-N-isopropylcarbamylmethyl)dithiophosphate,
O-o-tolyl O-ethyl O-(N-methoxy-N-isopropylcarbamylmethyl)thionophosphate,
O-m-tolyl O-ethyl S-(N-methoxy-N-isopropylcarbamylmethyl)thiophosphate,
O-m-cyanophenyl O-ethyl S-(N-methoxy-N-isopropylcarbamylmethyl)dithiophosphate,
and the like.

These compounds can readily be prepared by reacting a compound of the formula

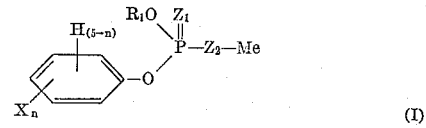

(I)

in which $R_1$, X, $n$, $Z_1$ and $Z_2$ are as described above and Me represents a cation such as ammonium or an alkali metal ion, with a compound of the formula

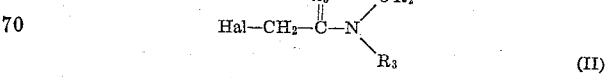

(II)

in which $R_2$, $R_3$ and $Z_3$ are as described above and Hal represents a halogen atom such as chlorine or bromine. The reaction is conveniently carried out in a suitable solvent, such as water, alcohols, ketones, esters, and the like, at room temperature or higher.

Exemplary of compounds of Formula I suitable for use in the preparation of the compounds utilized in the method of the present invention are: sodium O-m-tolyl O-methyl phosphorodithioate, ammonium O-o-tolyl O-methyl phosphorodithioate, sodium O-m-chlorophenyl O-methyl phosphorothioate, potassium O-p-chlorophenyl O-methyl phosphorothioate, sodium O-m-tolyl O-ethyl phosphorodithioate, ammonium O-o-tolyl O-ethyl phosphorodithioate, sodium O-m-tolyl O-ethyl phosphate, sodium O-p-chlorophenyl O-n-propyl phosphorodithioate, sodium O-m-tolyl O-isopropyl phosphorodithioate, sodium O-2,4-dichlorophenyl O-ethyl phosphorodithioate, sodium O-2-methyl-4-chlorophenyl O-ethyl phosphorodithioate, sodium O-p-tolyl O-isopropyl phosphorodithioate, sodium O-2,4,5-trichlorophenyl O-isopropyl phosphorodithioate, sodium m-cyanophenyl O-ethyl phosphorodithioate, and the like. These compounds can be readily prepared by treating phosphoryl trichloride or thiophosphoryl trichloride with $R_1OH$, then with the correspondingly substituted phenol, and finally with Me-hydrosulfide, wherein $R_1$ and Me are as described above. The Me-hydrosulfide can be formed in situ from Me-hydroxide and hydrogen sulfide or with the alkali metal itself in place of Me-hydroxide.

The compounds of Formula II which can be utilized as described above in the preparation of the compounds utilized in the method of the present invention can be prepared from their corresponding acid halides by treatment with amines of the formula $HN(OR_2)(R_3)$ wherein $R_2$ and $R_3$ are as described above. Many of the haloalkyl acid chlorides are known to the art and are commercially available. Exemplary of the suitable haloalkyl acid halides are α-chloroacetyl chloride, α-bromoacetyl chloride, and α-chloroacetyl bromide.

Many of the amines of the formula $HN(OR_2)(R_3)$ are known to the art. Typical of these amines are: N-methoxy-N-methylamine, N-ethoxy-N-methylamine, N-ethoxy-N-ethylamine, N-methoxy-N-ethylamine, N-n-propoxy-N-methylamine, N-isopropoxy-N-methylamine, N-methoxy-N-isopropylamine, N-methoxy-N-n-propylamine, N-ethoxy-N-isopropylamine, N-isopropoxy-N-isopropylamine, N-propoxy-N-n-propylamine, N-n-butoxy - N - n-butylamine, N-methoxy-N-tert-butylamine, N-tert-butoxy-N-methylamine, N-methoxy-N-sec-butylamine, N-n-pentyloxy-N-ethylamine, N-n-nonyloxy-N-methylamine, N-n-decyloxy-N-methylamine, N-methoxy - N - n-decylamine, and the like.

The manner in which the new compounds useful in the method of the present invention can be prepared is illustrated in the following examples.

*Example 1.—Preparation of O-m-chlorophenyl O-ethyl S-(N-methoxy-N-isopropylcarbamylmethyl)phosphorodithioate*

O-ethyl thiophosphoryl dichloride (36 g.; 0.2 mol) was added dropwise to a solution of m-chlorophenol (26 g.; 0.2 mol) and triethylamine (22 g.; 0.22 mol) dissolved in chlorobenzene (100 ml.) over a period of 30 minutes while the temperature of the mixture was maintained below —10° C. The resulting mixture was stirred vigorously for 1 hour at that temperature. The solution was poured into ice water, and the organic layer was separated, extracted with carbon tetrachloride and washed twice with water. The solvent was distilled off by heating gently under vacuum. The residue was distilled at 140–150° C. at 3–4 mm. Hg pressure through a falling film still and filtered to yield the desired O-m-chlorophenyl O-ethyl thiophosphoryl chloride as a distillate having a refractive index of 1.5480 at 25° C. and a chlorine content of 27.61% as compared to a calculated value of 26.2%.

Potassium hydroxide (7 g.) was dissolved in methanol (50 ml.) and saturated with hydrogen sulfide. O-m-chlorophenyl O-ethyl thiophosphoryl chloride (13.5 g.; 0.05 mol), prepared above, was added with stirring to the cooled solution prepared above. The solution was heated to reflux with stirring for 3 hrs. and then cooled and filtered free of precipitated potassium chloride. The filtrate was stripped of solvent by heating gently in vacuo. Benzene was added near the end of the heating to assure complete removal of the methanol solvent. The residue was placed in a three-neck flask to which benzene (100 ml.) and N-methoxy-N-isopropyl-α-chloroacetamide (8 g.; 0.05 mol) were added. The resulting mixture was heated to reflux with stirring for 16 hours, cooled, and filtered free of potassium chloride. The filtrate was washed twice with water, dried over anhydrous magnesium sulfate, filtered and heated at 60–70° C. in vacuo to remove the benzene solvent. The residue was the desired product O-m-chlorophenyl O-ethyl S-(N-methoxy-N-isopropylcarbamylmethyl)phosphorodithioate having a refractive index of 1.5340 at 29° C. and the following elemental analysis as calculated for $C_{14}H_{21}ClNO_4PS_2$:

Theoretical, percent: Cl, 8.9; N, 3.5; P, 6.20. Found, percent: Cl, 9.08; N, 4.11; P, 6.20.

*Example 2.—Preparation of O-p-chlorophenyl O-ethyl S-(N - methoxy - N - isopropylcarbamylmethyl)phosphorodithioate*

O-ethyl thiophosphoryl dichloride (36 g.; 0.2 mol) was added dropwise to a solution of p-chlorophenol (26 g.; 0.2 mol) and triethylamine (22 g.; 0.22 mol) dissolved in chlorobenzene (100 ml.) over a period of 15 minutes while the temperature of the mixture was maintained below —10° C. The resulting mixture was stirred vigorously for 1 hour at that temperature. The solution was poured into ice water, and the organic layer was separated, extracted with carbon tetrachloride, washed with ice water, and dried over magnesium sulfate, filtered, and the solvent evaporated in vacuo. The residue was filtered, distilled at 140–150° C. at 0.4 mm. Hg. pressure through a falling film still and filtered to recover the desired O-p-chlorophenyl O-ethyl thiophosphoryl chloride as a distillate having a refractive index of 1.5492 at 28° C.

Potassium hydroxide (7 g.) was dissolved in methanol (50 ml.) and saturated with hydrogen sulfide. O-p-chlorophenyl O-ethyl thiophosphoryl chloride (13.5 g.; 0.05 mol), prepared above, was added with stirring to the cooled solution prepared above. The solution was heated to reflux with stirring for 3 hours and then cooled and filtered free of precipitated potassium chloride. The filtrate was stripped of solvent by heating gently in vacuo. Benzene was added near the end of the heating to assure complete removal of the methanol solvent. The residue was placed in a three-neck flask to which benzene (100 ml) and N-methoxy-N-isopropyl-α-chloroacetamide (8 g.; 0.05 mol) were added. The resulting mixture was heated to reflux with stirring for 17 hours, cooled, and filtered free of potassium chloride. The filtrate was washed twice with water, dried over anhydrous magnesium sulfate, filtered and heated gently in vacuo to remove the benzene solvent. The residue was the desired product O-p-chlorophenyl O-ethyl S-(N-methoxy-N-isopropylcarbamylmethyl)phosphorodithioate which after filtering had a refractive index of 1.5391 at 22° C. and the following elemental analysis as calculated for $C_{14}H_{21}ClNO_4PS_2$:

Theoretical, percent: Cl, 8.9; N, 3.5; P, 7.8. Found, percent: Cl, 9.18; N, 3.89; P, 6.74.

*Example 3.—Preparation of O-o-chlorophenyl O-ethyl S - (N-methoxy-N-isopropylcarbamylmethyl)phosphorodithioate*

O-ethyl thiophosphoryl dichloride (36 g.; 0.2 mol) was added dropwise to a solution of o-chlorophenol (26 g.;

0.2 mol) and triethylamine (22 g.; 0.22 mol) dissolved in methylene chloride (100 ml.) over a period of 15 minutes while the temperature of the mixture was maintained below −10° C. The resulting mixture was maintained below −10° C. and stirred vigorously over a period of 1 hour. The solution was poured into ice water, and the organic layer was separated, washed once with water, and dried over anhydrous magnesium sulfate, filtered and evaporated in vacuo. The residue was distilled at 140–150° C. at 0.2 mm. Hg pressure through a falling film still to obtain the desired O-o-chlorophenyl O-ethyl thiophosphoryl chloride as a distillate having a refractive index of 1.5545 at 27° C. and a chlorine content of 26.44% as compared to a calculated value of 26.2%.

Potassium hydroxide (7 g.) was dissolved in methanol (50 ml.) saturated with hydrogen sulfide, and cooled. O-o-chlorophenyl O-ethyl thiophosphoryl chloride (13.5 g.; 0.05 mol), prepared above, was added with stirring to the cooled solution prepared above. The solution was heated to reflux with stirring for 3 hrs. and then cooled and filtered free of precipitated potassium chloride. The filtrate was stripped of solvent by heating in vacuo. Benzene was added near the end of the heating to assure complete removal of the methanol solvent. The residue was placed in a three-neck flask to which benzene (100 ml.) and N-methoxy-N-isopropyl-α-chloroacetamide (8 g.; 0.05 mol) were added. The resulting mixture was heated to reflux with stirring for 17 hours, cooled, and filtered free of potassium chloride. The filtrate was washed 3 times with water, dried over anhydrous magnesium sulfate, filtered and heated gently in vacuo to remove the benzene solvent. The residue was the desired product O-o-chlorophenyl O-ethyl S-(N-methoxy-N-isopropylcarbamylmethyl)-phosphorodithioate and after filtering had a refractive index of 1.5375 at 29° C. and the following elemental analysis as calculated for $C_{14}H_{21}ClNO_4PS_2$:

Theoretical, percent: Cl, 8.9; N, 3.5; P, 7.8. Found, percent: Cl, 9.95; N, 3.88; P, 7.11.

*Example 4.*—*Preparation of O-2,4-dichlorophenyl O-ethyl S - (N-methoxy-N-isopropylcarbamylmethyl) phosphorodithioate*

O-ethyl thiophosphoryl dichloride (36 g.; 0.2 mol) was cooled to 20° C. A solution of 2,4-dichlorophenol (32.5 g.; 0.2 mol) dissolved in a solution of sodium hydroxide (10 g.; 0.25 mol) in water (40 g.) was added with stirring to the O-ethyl thiophosphoryl dichloride over a period of 30 minutes while the temperature of the mixture was maintained at 25–30° C. The resulting mixture was maintained at 30° C. and stirred vigorously over a period of 30 minutes. The organic layer was separated, washed once with a 10% aqueous sodium hydroxide solution (50 ml.) and twice with water, and dried under vacuum. The residue was the desired O-2,4-dichlorophenyl O-ethyl thiophosphoryl chloride having a refractive index of 1.5750 at 29° C.

Potassium hydroxide (7 g.) was dissolved in methanol (50 ml.) and saturated with hydrogen sulfide and cooled. O-2,4-dichlorophenyl O-ethyl thiophosphoryl chloride (15 g.; 0.05 mol), was added with stirring to the cooled solution prepared above. The solution was heated to reflux with stirring for 3 hrs. and then cooled and filtered free of precipitated potassium chloride. The filtrate was stripped of solvent by heating in vacuo. Benzene was added near the end of the heating to assure complete removal of the methanol solvent. The residue was placed in a three-neck flask to which benzene (100 ml.) and N-methoxy-N-isopropyl-α-chloroacetamide (8 g.; 0.05 mol) were added. The resulting mixture was heated to reflux with stirring for 17 hours, cooled, and filtered free of potassium chloride. The filtrate was heated in vacuo to remove the benzene solvent. The residue was the desired product O-2,4-dichlorophenyl O-ethyl S-(N-methoxy - N - isopropylcarbamylmethyl)phosphorodithioate having a refractive index of 1.5498 at 25° C. and the following elemental analysis as calculated for $$C_{14}H_{20}Cl_2NO_4PS_2$$

Theoretical, percent: N, 3.2; P, 7.2. Found, percent: N, 3.15; P, 6.72.

*Example 5.*—*Preparation of O - 2,4,5 - trichlorophenyl O-ethyl S - (N - methoxy-N-isopropylcarbamylmethyl) phosphorodithioate*

O-ethyl thiophosphoryl dichloride (40 g.; 0.22 mol) was cooled to 20° C. A solution of 2,4,5-trichlorophenol (39.5 g.; 0.2 mol) dissolved in a solution of sodium hydroxide (10 g.; 0.25 mol) in water (40 ml.) was added with stirring to the O-ethyl thiophosphoryl dichloride over a period of 30 minutes while the temperature of the mixture was maintained at 25–30° C. The resulting mixture was maintained at 30° C. and stirred vigorously over a period of 30 minutes. The organic layer was separated, washed once with a 10% aqueous sodium hydroxide solution (50 ml.) and twice with water, and dried under vacuum. The residue was filtered through filter aid to yield the desired O-2,4,5-trichlorophenyl O-ethyl thiophosphoryl chloride as the filtrate having a refractive index of 1.5866 at 28° C.

Potassium hydroxide (7 g.) was dissolved in methanol (50 ml.) and saturated with hydrogen sulfide. O-2,4,5-trichlorophenyl O-ethyl thiophosphoryl chloride (17 g.; 0.05 mol), was added with stirring to the cooled solution prepared above. The solution was heated to reflux with stirring for 3 hours and then cooled and filtered free of precipitated potassium chloride. The filtrate was stripped of solvent by heating in vacuo. Benzene was added near the end of the heating to assure complete removal of the methanol solvent. The residue was placed in a three-neck flask to which benzene (100 ml.) and N-methoxy-N-isopropyl-α-chloroacetamide (8 g.; 0.05 mol) were added. The resulting mixture was heated to reflux with stirring for 18 hours, cooled and filtered free of potassium chloride. The filtrate was washed with water, cold aqueous sodium hydroxide, twice with water, dried over anhydrous magnesium sulfate, filtered and heated at 65° C. in vacuo to remove the benzene solvent. The residue was the desired product O-2,4,5-trichlorophenyl O - ethyl S - (N - methoxy - N-isopropylcarbamylmethyl) phosphorodithioate having the following elemental analysis as calculated for $C_{14}H_{19}Cl_3NO_4PS_2$:

Theoretical, percent: N, 3.0; P, 6.65; S, 13.7. Found, percent: N, 3.58; P, 5.69; S, 13.30.

*Example 6.*—*Preparation of O - m - ethylphenyl O - ethyl S - (N - methoxy - N - isopropylcarbamylmethyl)phosphorodithioate*

O-ethyl thiophosphoryl dichloride (40 g.; 0.22 mol) is cooled to 20° C. A solution of m-ethylphenol (24 g.; 0.2 mol) dissolved in a solution of sodium hydroxide (10 g.; 0.25 mol) in water (38 g.) is added with stirring to the O-ethyl thiophosphoryl dichloride over a period of 30 minutes while the temperature of the mixture is maintained at 25–30° C. The resulting mixture is maintained at 30° C. and stirred vigorously over a period of 30 minutes. The organic layer is separated, washed once with a 15% aqueous potassium hydroxide solution (100 ml.) and twice with water, and dried under vacuum. The residue is the desired O-m-ethylphenyl O-ethyl thiophosphoryl chloride.

Potassium hydroxide (7 g.) was dissolved in methanol (50 ml.), saturated with hydrogen sulfide and cooled. O-m-ethylphenyl O-ethyl thiophosphoryl chloride (13 g.; 0.05 mol), prepared above, is added with stirring to the cooled solution prepared above. The solution is heated to reflux with stirring for 3 hrs. and then cooled and filtered free of precipitated potassium chloride. The filtrate is stripped of solvent by heating gently in vacuo. Benzene is added near the end of the heating to assure complete removal of the methanol solvent. The residue is placed in a three-neck flask to which benzene (100 ml.) and N-methoxy-N-isopropyl-α-chloroacetamide (8 g.; 0.05 mol) are added. The resulting mixture is heated to reflux with stirring for 18 hours, cooled, and filtered free of potassium chloride. The filtrate is washed twice with water, dried over anhydrous magnesium sulfate, filtered and heated in vacuo to remove the benzene solvent. The residue is the desired product O-m-ethylphenyl O-ethyl S-(N - methoxy-N-isopropylcarbamylmethyl) phosphorodithioate.

*Example 7.—Preparation of O-p-cyanophenyl O-ethyl S - (N - methoxy - N - isopropylcarbamylmethyl) phosphorodithioate*

O-ethyl thiophosphoryl dichloride (40 g.; 0.22 mol) is cooled to 20° C. A solution of p-hydroxybenzonitrile (24 g.; 0.2 mol) dissolved in a solution of sodium hydroxide (10 g.; 0.25 mol) in water (38 g.) is added with stirring to the O-ethyl thiophosphoryl dichloride over a period of 30 minutes while the temperature of the mixture is maintained at 25–30° C. The resulting mixture is maintained at 30° C. and stirred vigorously over a period of 30 minutes. The organic layer is separated, washed once with a 10% aqueous potassium hydroxide solution (100 ml.) and twice with water, and dried under vacuum. The residue is the desired O-p-cyanophenyl O-ethyl thiophosphoryl chloride.

Potassium hydroxide (7 g.;) is dissolved in methanol (50 ml.) and saturated with hydrogen sulfide. O-p-cyanophenyl O-ethyl thiophosphoryl chloride (13 g.; 0.05 mol), is added with stirring to the cooled solution prepared above. The solution is heated to reflux with stirring for 3 hrs. and then cooled and filtered free of precipitated potassium chloride. The filtrate is stripped of solvent by heating in vacuo. Benzene is added near the end of the heating to assure complete removal of the methanol solvent. The residue is placed in a three-neck flask to which benzene (100 ml.) and N-methoxy-N-isopropyl-α-chloroacetamide (8 g.; 0.05 mol) are added. The resulting mixture is heated to reflux with stirring for 5 hrs., cooled, and filtered free of potassium chloride. The filtrate is washed twice with water, dried over anhydrous magnesium sulfate, filtered and heated at 65° C. in vacuo to remove the benzene solvent. The residue is the desired product O-p-cyanophenyl O-ethyl S-(N-methoxy-N-isopropylcarbamylmethyl) phosphorodithioate.

In this manner heretofore described other compounds which are useful in the method of the present invention can be prepared readily. Presented in the following examples are the essential ingredients required to prepare the indicated named compounds according to the procedure detailed in the foregoing examples.

*Example 8*

O-ethyl phosphoryl dichloride+2,4-dichlorophenol+potassium hydrosulfide+N-methoxy-N-isopropyl-α-chloroacetamide=O-2,4-dichloro phenyl O-ethyl S-(N-methoxy-N-isopropylcarbamylmethyl) phosphorothioate.

*Example 9*

O - ethyl phosphoryl dichloride+2,4,5 - trichlorophenol+potassium hydrosulfide+N-methoxy-N-isopropyl-α-chloroacetamide=O-2,4,5-trichlorophenyl O-ethyl S-(N-methoxy-N-isopropylcarbamylmethyl) phosphorothioate.

*Example 10*

O-ethyl thiophosphoryl dichloride+4-chloro-o-cresol+potassium hydrosulfide+N-isopropoxy-N-methyl-α-chloroacetamide=O-2-methyl-4-chlorophenyl O-ethyl S-(N-isopropoxy-N - methylcarbamylmethyl) phosphorodithioate.

*Example 11*

Thiophosphoryl trichloride+n-butyl alcohol+p-bromophenol+potassium hydrosulfide+N-methoxy-N-n-propyl-α-chloroacetamide=O-p-bromophenyl O-n-butyl S-(N-methoxy-N - isopropylcarbamylmethyl) phosphorodithioate.

*Example 12*

O-ethyl thiophosphoryl dichloride+3,5 - dimethoxyphenol+potassium hydrosulfide+N-methoxy-N - isopropyl-α-chloroacetamide=O-3,5-dimethoxyphenyl O - ethyl S-(N-methoxy - N-isopropylcarbamylmethyl) phosphorodithioate.

*Example 13*

Thiophosphoryl trichloride+tert - butyl alcohol+m-cresol+potassium hydrosulfide+N-methoxy-N - n-pentyl-α-chloroacetamide=O-m-tolyl O-tert-butyl S-(N-methoxy-N-n-pentylcarbamylmethyl) phosphorodithioate.

*Example 14*

Thiophosphoryl trichloride+n-hexyl alcohol+2-ethyl-4-chlorophenol+potassium hydrosulfide+N - propoxy-N-propyl-α-chloroacetamide=O - 2 - ethyl-4-chlorophenyl O - n - hexyl S-(N-n-propoxy-N-n-propylcarbamylmethyl) phosphorodithioate.

*Example 15*

Thiophosphoryl trichloride+n - butyl alcohol+mesitol+potassium hydrosulfide+N-methoxy-N -n - decyl-α-chloroacetamide=O-2,4,6-trimethylphenyl O - n - butyl S-(N-methoxy-N-n - decylcarbamylmethyl) phosphorodithioate.

*Example 16*

O - ethyl phosphoryl dichloride+m - methylthiophenol+potassium hydrosulfide+N - methoxy - N - isopropyl - α - chloroacetamide=O-m-methylthiophenyl O-ethyl S - (N - methoxy - N - isopropylcarbamylmethyl) phosphorodithioate.

*Example 17*

Thiophosphoryl trichloride+n - octyl alcohol+o-ethoxphenol+potassium hydrosulfide+N - n - butoxy - N-ethyl - α - chloroacetamide=O - o - ethoxyphenyl O-n-octyl S- (N-n-butoxy-N-ethylcarbamylmethyl) phosphorodithioate.

*Example 18*

O - ethyl thiophosphoryl dichloride+2 - methoxy-3,6-dichlorophenol+potassium hydrosulfide+N - methoxy-N-isopropyl - α - chloroacetamide=O - (2-methoxy-3,6-dichlorophenyl) O - ethyl S - (N - methoxy-N-isopropylcarbamylmethyl) phosphorodithioate.

*Example 19*

Thiophosphoryl trichloride+n - propyl alcohol+3,5-dibromophenol+potassium hydrosulfide+N - methoxy-N - n - decyl - α - chloroacetamide=O-3,5-dibromophenyl O - n - propyl S-(N-methoxy-N-n-decylcarbamylmethyl) phosphorodithioate.

For practical use as herbicides, the compounds heretofore described are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionc or mixtures of nonionic with anionic surface-active agents. With the use of some emulsifier systems an inverted emulsion (water in-oil) can be prepared for direct application to weed infestations.

The process of the present invention for the control of weeds comprises contacting the locus of said weeds with a herbicidal composition comprising an inert carrier and as an essential active ingredient, in a quantity which is herbicidally toxic to said weeds, a compound of the present invention. The concentration of the active compounds in the herbicidal compositions will vary greatly with the type of formulation and the purpose for which it is designed, but generally the herbicidal compositions will comprise from about 0.05 to about 95 percent by weight of the active compounds. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers; spreaders; deactivators; adhesives; stickers; fertilizers; activators; synergists; and the like.

The method of the present invention can also be used with the active compounds combined with other herbicides and/or defoliants, dessicants, growth inhibitors, and the like, in the herbicidal compositions heretofore described. These other materials can comprise from about 5% to about 95% of the active ingredients in the herbicidal compositions. Use of combinations of these other herbicides and/or defoliants, dessicants, etc. with the compounds heretofore described provide herbicidal compositions which are more effective in controlling weeds and often provide results unattainable with separate compositions of the individual herbicides. The other herbicides, defoliants, dessicants and plant growth inhibitors, with which the compounds heretofore described can be used in the herbicidal compositions to control weeds, can include chlorophenoxy herbicides such as 2,4–D, 2,4,5–T, MCPA, MCPB, 4(2,4–DB), and the like; carbamate herbicides such as IPC, CIPC, swep barban, and the like; thiocarbamate and dithiocarbamate herbicides such as CDEC, metham sodium, EPTC, diallate, PEBC, and the like; substituted urea herbicides such as dichloral urea, fenuron, monuron, diuron, linuron, neburon, and the like; symmetrical triazine herbicides such as simazine, chlorazine, atrazine, trietazine, simetone, prometone, propazine, ametryne, and the like; chloroacetamide herbicides such as alpha-chloro-N,N-dimethyl-acetamide, CDEA, alpha-chloro-N-isopropyl-acetamide, 4 - (chloroacetyl)morpholine, 1-(chloroacetyl)piperidine, and the like; chlorinated aliphatic acid herbicides such as TCA, dalapon, 2,3-dichloropropionic acid, and the like, chlorinated benzoic acid and phenylacetic acid herbicides such as 2,3,6–TBA, 2,3,5,6–TBA, dicamba, tricamba, amiben, fenac, 2-methoxy - 3,6 - dichlorophenylacetic acid, 3 - methoxy-2,6-dichlorophenylacetic acid, 2-methoxy-3,5,6-trichlorophenylacetic acid, and the like; and such compounds as O,S-dimethyl tetrachlorothioterephthalate, methyl 2,3,5,6-tetrachloro-N-methoxy-N-methylterephthalamate, 2 - [(4-chloro-o-tolyl)-oxyl]-N-methoxyacetamide, phenyl mercuric acetate, endothal, biuret, technical chlordane, dimethyl 2,3,5,6-tetrachloroterephthalate, diquat, erbon, DNC, DNBP, dichlorobenil; DPA, diphenamid, dipropalin, trifluralin, solan, dicryl, merphos, DMPA and the like. Such herbicides can also be used in the method of this invention in the form of their salts, esters, amides, and other derivatives whenever applicable to the particular parent compounds.

Weeds are undesirable plants growing where they are not wanted, having no economical value, and interfering with the production of cultivated crops, with the growing of ornamental plants, or with the welfare of livestock. Many types of weeds are known including annuals such as pigweed, lamb's quarters, foxtail, crabgrass, wild mustard, field pennycress, ryegrass, goose-grass, chickweed, wild oats, velvet leaf, purselane, barnyard grass, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, curly dock, nutgrass, field chickweed, and winter-cress. Similarly, such weeds can be classified as broadleaf or grassy weeds. It is economically desirable to control the growth of such weeds without damaging beneficial plants or livestock.

The compounds utilized in the method of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

Some typical herbicidal compositions which can be used in the method of this invention are shown in the following examples, in which all quantities given are in parts by weight.

*Example 20.—Preparation of an emulsifiable concentrate*

The following ingredients are blended thoroughly until a homogenous liquid concentrate is obtained. This concentrate is mixed with water to give an aqueous dispersion containing the desired concentration of active compound for use as a spray.

| | |
|---|---|
| Product of Example 1 | 25 |
| Sodium lauryl sulfate | 2 |
| Sodium lignin sulfonate | 3 |
| Kerosene | 70 |

*Example 21.—Preparation of a wettable powder*

The following components are mixed intimately in conventional mixing or blending equipment and are then ground to a powder having an average particle size of less than about 50 microns. The finished powder is dispersed in water to give the desired concentration of active compound.

| | |
|---|---|
| Product of Example 2 | 75.00 |
| Fuller's earth | 22.75 |
| Sodium lauryl sulfate | 2.00 |
| Methyl cellulose | .25 |

Example 22.—Preparation of an oil-dispersible powder

The following components are blended and ground as described in the previous example to give a powder which can be dispersed in oil to form a spray containing the desired concentration of active compound

| | |
|---|---|
| Product of Example 3 | 70 |
| Condensation product of diamylphenol with ethylene oxide | 4 |
| Fuller's earth | 26 |

Example 23.—Preparation of a dust

The following ingredients are mixed thoroughly and then ground to an average particle size of less than about 50 microns to give a dust suitable for application with conventional dusting equipment.

| | |
|---|---|
| Product of Example 1 | 10 |
| Talc | 90 |

Example 24.—Preparation of a granular formulation

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

| | |
|---|---|
| Product of Example 2 | 10 |
| Fuller's earth | 66 |
| Dextrin | 20 |
| Sodium lignin sulfonate | 3 |
| Kerosene | 1 |

The herbicidal method of the present invention can be illustrated by many of the established testing techniques known to the art, such as pre- and postemergence testing. In one preemergence test, emulsifiable concentrates or solutions prepared as heretofore described can be extended with water or oil or other suitable extenders, to obtain various concentrations of the active compound. These concentrates are sprayed on the surface of soil which had been seeded less than twenty-four hours earlier with wed seeds. After spraying the soil containers are maintained under normal lighting conditions and supplied with heat as required and daily or more frequent watering. The weeds are observed for about 7 to about 20 days, and the degree of injury to the weeds is recorded.

To demonstrate the postemergence activity of the method of this invention, emulsifiable concentrates or solutions of various concentrations of the aforementioned active compounds are sprayed on the foliage of weeds that have attained a prescribed size. After spraying, the weeds are maintained under normal lighting conditions and supplied with heat as required. The soil in which the weeds are growing is watered daily or more frequently. The weeds are observed periodically for up to 14 days or more, and the severity of injury to the weeds is recorded.

The utility of the method of this invention in controlling weeds was demonstrated by experiments. In one series of experiments, test compounds, formulated as aqueous emulsions of acetone solutions containing emulsifiers, were sprayed at a concentration of 2 pounds actual chemical per acre on the surface of soil which had been seeded less than twenty-four hours earlier with seeds of crop plants and weeds. After spraying, the soil containers were placed in the greenhouse and provided with supplementary light and heat as required and daily or more frequent watering. The type and severity of injury to each crop and weed were determined 15 and 20 days after the soil treatments and compared to control plots treated with the same formulations without the essential active compounds. The severity of injury was rated on a scale of from 0 to 10, with 0 denoting no injury and 10 denoting total death of the plant. The results of this series of experiments are presented below:

INJURY RATINGS

| Active Compound, Product of— | Weed Species | | | Beneficial Plants | | |
|---|---|---|---|---|---|---|
| | Crabgrass | Barnyard Grass | Foxtail | Corn | Cotton | Rice |
| Example 1 | 9 | 9 | 9 | 0 | 0 | 0 |
| Example 2 | 10 | 8 | 8 | 0 | 0 | 1 |
| Example 3 | 9 | 9 | 7 | 0 | 0 | 0 |
| Example 4 | 7 | 8 | 8 | 0 | 0 | 0 |
| Example 5 | 8 | 4 | 7 | 0 | 0 | 0 |
| Control | 0 | 0 | 0 | 0 | 0 | 0 |

I claim:
1. A method for the control of undesirable plant life which comprises applying to the locus of the said plant life a herbicidal composition comprising an inert carrier and as the essential active ingredient, in a quantity which is herbicidally injurious to said undesirable plant life, a compound of the formula

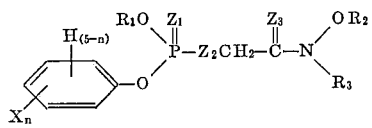

wherein $Z_1$, $Z_2$ and $Z_3$ are independently selected from the group consisting of sulfur and oxygen; $R_1$, $R_2$ and $R_3$ are independently selected lower alkyl; $n$ is an integer from 1 to 5; and each X is independently selected from the group consisting of halogen, cyano, lower alkyl, lower alkoxy, and lower alkylthio.

2. A method for the control of undesirable plant life which comprises applying to the locus of the said plant life a herbicidal composition comprising an inert carrier and as the essential active ingredient, in a quantity which is herbicidally injurious to said undesirable plant life, a compound of the formula

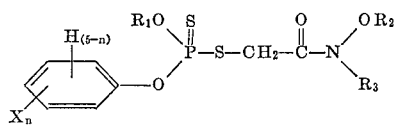

wherein $R_1$, $R_2$ and $R_3$ are independently selected alkyl containing 1 to 10 carbon atoms; $n$ is an integer from 1 to 3; and each X is independently selected from the group consisting of chlorine, bromine, cyano and alkyl, alkoxy and alkylthio containing 1 to 4 carbon atoms.

3. The method of claim 1 wherein the compound is O-m-ethylphenyl O-ethyl S-(N-methoxy-N-isopropylcarbamylmethyl)dithiophosphate.

4. The method of claim 1 wherein the compound is O-o-chloropehnyl O-ethyl S-(N-methoxy-N-isopropylcarbamylmethyl)dithiophosphate.

5. The method of claim 1 wherein the compound is O-m-chlorophenyl O-ethyl S-(N-methoxy-N-isopropylcarbamylmethyl)dithiophosphate.

6. The method of claim 1 wherein the compound is O-p-chlorophenyl O-ethyl S-(N-methoxy-N-isopropylcarbamylmethyl)dithiophosphate.

7. The method of claim 1 wherein the compound is O-2,4-dichlorophenyl O-ethyl S-(N-methoxy-N-isopropylcarbamylethyl)dithiophosphate.

8. The method of claim 1 wherein the compound is O-2,4,5-trichlorophenyl O-ethyl S-(N-methoxy-N-isopropylcarbamylmethyl)dithiophosphate.

References Cited
UNITED STATES PATENTS

| 3,092,541 | 6/1963 | Beriger | 167—22 |
| 3,102,023 | 8/1963 | Speziale et al. | 71—2.7 |

JAMES O. THOMAS, JR., *Primary Examiner.*